US010072618B2

(12) United States Patent
Menke

(10) Patent No.: US 10,072,618 B2
(45) Date of Patent: Sep. 11, 2018

(54) ACTIVATED CARBON FILTER APPARATUS

(71) Applicant: Dr. Ing. h.c. F. Porsche Aktiengesellschaft, Stuttgart (DE)

(72) Inventor: Andreas Menke, Vaihingen a.d.Enz/Enzweihingen (DE)

(73) Assignee: DR.ING. H.V.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/091,699

(22) Filed: Apr. 6, 2016

(65) Prior Publication Data

US 2016/0296877 A1 Oct. 13, 2016

(30) Foreign Application Priority Data

Apr. 7, 2015 (DE) .................. 10 2015 105 214

(51) Int. Cl.
*B01D 53/04* (2006.01)
*F02M 25/08* (2006.01)

(52) U.S. Cl.
CPC ..... *F02M 25/0854* (2013.01); *B01D 53/0407* (2013.01); *B01D 2253/102* (2013.01); *B01D 2257/702* (2013.01); *B01D 2259/4516* (2013.01)

(58) Field of Classification Search
CPC .......... B01D 53/0407; B01D 2253/102; B01D 2257/702; B01D 2259/4516; F02M 25/0854
USPC ............ 95/146; 96/108, 121, 131, 139, 152; 123/519
See application file for complete search history.

(56) References Cited

U.S. PATENT DOCUMENTS

| 5,398,660 A | * | 3/1995 | Koyama | F02M 25/0854 123/519 |
| 5,564,398 A | * | 10/1996 | Maeda | F02M 25/0854 123/519 |
| 5,743,943 A | * | 4/1998 | Maeda | B01D 53/0415 123/519 |
| 7,086,389 B2 | | 4/2006 | Yamada | |
| 8,500,875 B2 | * | 8/2013 | Yamamoto | B01D 53/0423 422/187 |

(Continued)

FOREIGN PATENT DOCUMENTS

| DE | 10 2007 056 667 | 5/2009 |
| DE | 10 2011 003 965 | 9/2011 |
| WO | 2014/059190 | 4/2014 |

OTHER PUBLICATIONS

Ferman Search Report dated Dec. 2, 2015.

*Primary Examiner* — Frank Lawrence
(74) *Attorney, Agent, or Firm* — Gerald E. Hespos; Michael J. Porco; Matthew T. Hespos

(57) ABSTRACT

An activated carbon filter apparatus has a housing with an interior space with an activated carbon filter arranged therein. The activated carbon filter is divided into a first region and a second region. An activated carbon filling is in each region. The two regions are divided into different sections by dividing walls. The sections being filled with activated carbon, and the sections of one region and the two sections at the transition between the first region and the second region are connected fluidically to one another by crossflow regions. A void volume is provided in the first region and/or in the second region below an activated carbon filling of one section to receive desorbed hydrocarbons.

8 Claims, 1 Drawing Sheet

(56) References Cited

U.S. PATENT DOCUMENTS

| | | | |
|---|---|---|---|
| 2004/0083894 A1* | 5/2004 | Koyama | B01D 53/02 96/133 |
| 2006/0102156 A1* | 5/2006 | Yamauchi | B01D 53/0415 123/519 |
| 2011/0155107 A1 | 6/2011 | Lin et al. | |
| 2013/0160651 A1* | 6/2013 | Mani | F02M 35/0218 96/132 |
| 2014/0060497 A1 | 3/2014 | Akiyama et al. | |

* cited by examiner

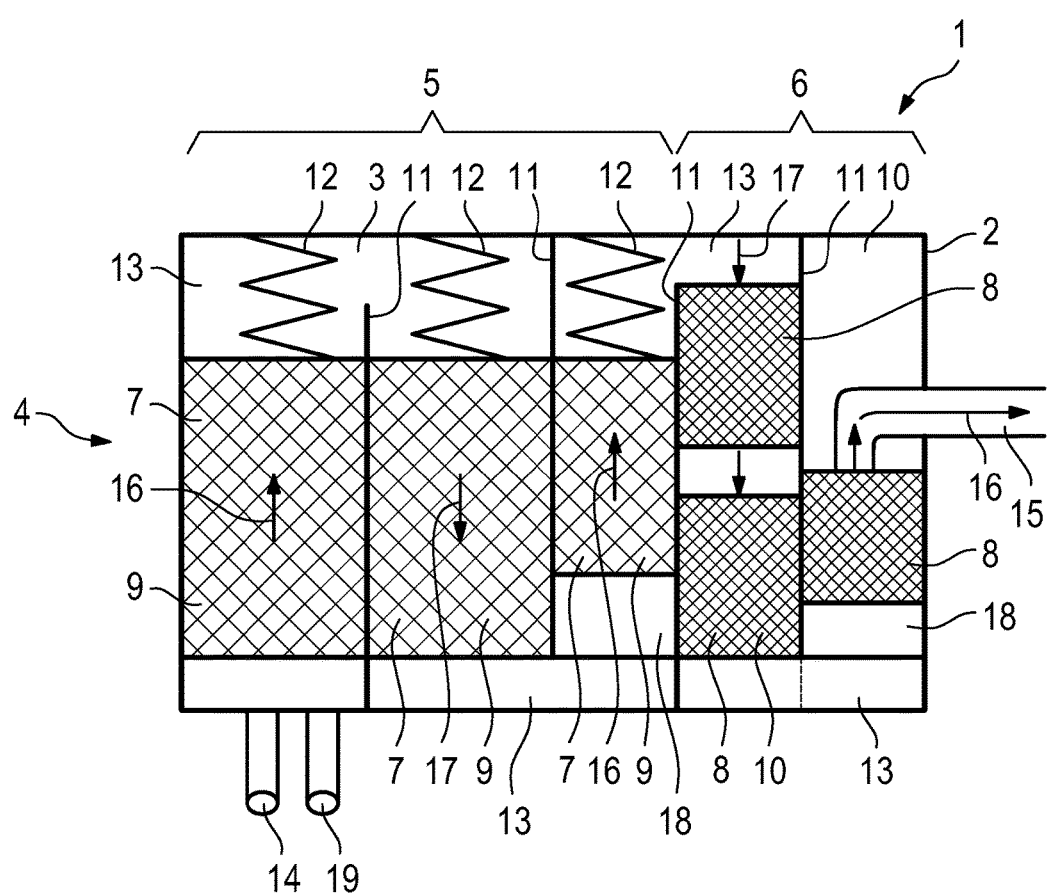

ACTIVATED CARBON FILTER APPARATUS

CROSS REFERENCE TO RELATED APPLICATION

This application claims priority under 35 USC 119 to German Patent Appl. No. 10 2015 105 214.8 filed on Apr. 7, 2015, the entire disclosure of which is incorporated herein by reference.

BACKGROUND

1. Field of the Invention

The invention relates to an activated carbon filter apparatus for a motor vehicle.

2. Description of the Related Art

Activated carbon filter apparatuses have been disclosed in motor vehicles to filter vapors that contain hydrocarbons and to ensure that the hydrocarbons cannot escape from the tank and into the surroundings. The hydrocarbons are adsorbed by the activated carbon and are retained as a result.

During operation of the internal combustion engine, the loaded activated carbon of the activated carbon filter apparatus can then be flushed, and the desorbed hydrocarbons can be fed to the internal combustion engine and burned. To this end, fresh air can be introduced through a fresh air opening into the housing of the activated carbon filter apparatus on account of a vacuum from the intake cycle of the internal combustion engine, and the hydrocarbons can be guided to the internal combustion engine and burned as a result of the flushing.

The activated carbon filter apparatus usually has two regions that are filled in each case with activated carbon. The first region has mechanically prestressed activated carbon for adsorbing the hydrocarbons. The second region follows the first region and has an activated carbon filling that absorb the hydrocarbons that exit from the first region at a standstill of the motor vehicle. The activated carbon and/or activated carbon structures usually are configured, for example, as honeycomb structures. They are relatively expensive and should therefore be avoided.

U.S. Pat. No. 7,086,389 B2 discloses an activated carbon filter apparatus that has two volumes filled with activated carbon and connected to one another via a connection at the top. As a result, a relatively short path exists for the hydrocarbons and impairs adsorption.

It is an object of the invention to provide an activated carbon filter apparatus that is improved in comparison with the prior art and can be manufactured inexpensively.

SUMMARY

The invention relates to an activated carbon filter apparatus that has a housing with an interior space and an activated carbon filter arranged therein. The activated carbon filter is divided into first and second regions each of which has activated carbon filling. Each region is divided into different sections by dividing walls. The sections are filled with activated carbon, and the sections of one region and the two sections at the transition between the first region and the second region are connected fluidically in each case to one another by crossflow regions. A void volume is provided in the first region and/or in the second region below an activated carbon filling of one section to receive desorbed hydrocarbons. This achieves a situation where the desorbed hydrocarbons can be collected in the void volume or in the void volumes that are present, and do not have to pass through the activated carbon filling of the second region. This permits inexpensive absorption of the hydrocarbons that exit from the first region from the activated carbon filling that is provided there at a standstill of the motor vehicle, and is called bleeding emission. The void volume also is advantageous because the hydraulic pressure or the pressure drop during flushing of the activated carbon material is not increased, since the air that flows in from the fresh air inlet is not subjected to any additional resistance.

The dividing walls for dividing the sections may be oriented vertically. Thus, the sections are oriented vertically and throughflow of the sections takes place substantially vertically, substantially from the top toward the bottom or substantially from the bottom toward the top.

The crossflow regions for the fluidic connection of two sections may be arranged above or below the dividing walls and the activated carbon filling of the respective connected sections. As a result, the sections can be connected one after another in the flow direction and can be flowed through substantially vertically.

The crossflow regions are not filled with activated carbon. This achieves improved crossflow without a substantial pressure drop caused by the crossflow regions.

The void volume may be arranged at the level of a dividing wall, but below an activated carbon filling. As a result, a free volume for collecting the hydrocarbons is achieved in addition to the crossflow regions.

The void volume may be arranged in a section that can be flowed through by the hydrocarbons in a vertical flow toward the top. As a result, the hydrocarbons collect below the activated carbon filling on account of their weight, which is heavier than air.

A void volume may be arranged in a plurality of sections. As a result, the desorbed hydrocarbon can be collected in various spatial regions, depending on where it is desorbed, that is to say in which section.

At least one void volume may have a volume of from 50 ml to 300 ml. As a result, sufficient free volume is provided to collect desorbed hydrocarbons. Therefore, each of the void volumes can also be of the size.

The sections can be flowed through one after another and in an alternating direction from the top toward the bottom and from the bottom toward the top. As a result, a long path for the flow is achieved and satisfactory adsorption is brought about.

A fresh air inlet and/or an extraction connector may be provided on the housing to extract the hydrocarbons via the extraction connector and/or for fresh air to flow in through the fresh air inlet. The various flows can thus be defined and discharged or fed in satisfactorily.

In the following text, the invention will be explained in detail using one exemplary embodiment with reference to the drawing.

BRIEF DESCRIPTION OF THE DRAWINGS

FIG. 1 is a diagrammatic illustration of an activated carbon filter apparatus.

DETAILED DESCRIPTION

FIG. 1 shows an activated carbon filter apparatus 1 with a housing 2 that has an interior space 3. An activated carbon filter 4 is arranged in the interior space 3. The activated carbon filter 4 is divided into at least two regions 5, 6, each of which has an activated carbon filling 7, 8.

Each region 5, 6 is divided into sections 9, 10. To this end, vertically running dividing walls 11 separate the sections 9, 10 from one another.

Activated carbon fillings 7, 8 are provided in the sections 9, 10. The activated carbon filling 7 of the first region 5 is different than the activated carbon filling 8 of the second region. In the first region 5, the activated carbon filling 7 can be configured as a bulk fill that can be set under pressure by means of springs 12 or the like. The activated carbon filling 8 of the second region 6 can be configured as a poured activated carbon filling, a honeycomb structure or the like.

The sections 9, 10 are configured to be connected fluidically to one another in pairs by way of a crossflow region 13. The two left-hand sections 9 are thus connected by the upper crossflow region 13, and the second section 9 and the third section 9 from the left are connected by a crossflow region 13 at the bottom. The third section 9 and the fourth section 10 from the left are connected by a crossflow region 13 at the top. The fourth section 10 and the fifth section 10 from the left are again connected by a crossflow region 13 at the top. A fresh air inlet 14 and an inlet 19 for the vapors that contain hydrocarbons are provided on the first section 9, and an extraction connector 15 is provided on the fifth section 10. The crossflow regions 13 are not filled with activated carbon for improved throughflow.

As can be seen in FIG. 1, the sections can be flowed through one after another from the left to the right and in an alternating direction from the top toward the bottom and from the bottom toward the top, see the arrows 16, 17.

A void volume 18 is provided to receive desorbed hydrocarbons in sections, such as in the third section and in the fifth section, in particular in the first region and/or in the second region below an activated carbon filling 7, 8.

The void volumes 18 are arranged in the region of the dividing walls 11 for dividing the sections 9, 10. The dividing walls 11 are oriented vertically. The crossflow regions 13 for the fluidic connection of two sections 9, 10 are arranged above or below the dividing walls 11 and the activated carbon filling 7, 8 of the respective connected sections 9, 10. The void volume 18 is arranged above a lower crossflow region 13 and thus is arranged at the level of a dividing wall 11 but below an activated carbon filling 7, 8.

It can also be seen that the void volume 18 is arranged in a section 9, 10 that can be flowed through by the hydrocarbons in a vertical flow toward the top (see arrow 16). As a result, the hydrocarbon is collected below the activated carbon filling on account of its weight.

One void volume 18 is arranged in a section 9, 10, or void volumes 18 of this type are arranged in a plurality of sections 9, 10.

The at least one void volume has a volume of from 50 ml to 300 ml.

LIST OF DESIGNATIONS

1 Activated carbon filter apparatus
2 Housing
3 Interior space
4 Activated carbon filter
5 Region
6 Region
7 Activated carbon filling
8 Activated carbon filling
9 Section
10 Section
11 Dividing wall
12 Spring
13 Crossflow region
14 Fresh air inlet
15 Extraction connector
16 Arrow
17 Arrow
18 Void volume
19 Inlet

What is claimed is:

1. An activated carbon filter apparatus having a housing with an interior space defined by opposed top and bottom walls, an inlet and an outlet communicating with the interior space, the housing being divided into plural sections by an alternating array of upwardly extending dividing walls extending up from the bottom wall to a free end spaced from the top wall and downwardly extending dividing walls extending down from the top wall to a free end spaced from the bottom wall, upper crossflow regions connecting adjacent sections between the free ends of the upwardly extending dividing walls and the top wall of the housing, and lower crossflow regions connecting adjacent sections between the free ends of the downwardly extending dividing walls and the bottom wall of the housing, the sections being at least partly filled with activated carbon, and the sections that are adjacent to one another being fluidically connected to one another by the crossflow regions, and at least one void volume being provided in at least one of the sections above the respective lower crossflow regions and below an activated carbon filling of the respective section to receive desorbed hydrocarbons.

2. The activated carbon filter apparatus of claim 1, wherein the crossflow regions are not filled with activated carbon.

3. The activated carbon filter apparatus of claim 1, wherein the void volume is arranged above the free end of one of the downwardly extending dividing walls.

4. The activated carbon filter apparatus of claim 1, wherein the void volume is arranged in a section that can be flowed through by the hydrocarbons in a vertical flow toward the top.

5. The activated carbon filter apparatus of claim 1, wherein the void volume is arranged in a plurality of the sections.

6. The activated carbon filter apparatus of claim 1, wherein the at least one void volume has a volume of from 50 ml to 300 ml.

7. The activated carbon filter apparatus of claim 1, wherein the sections are flowed through one after another and in an alternating direction from the top toward the bottom and from the bottom toward the top.

8. The activated carbon filter apparatus of claim 1, further comprising a fresh air inlet and wherein the outlet is an extraction connector on the housing for enabling extraction of the hydrocarbons via the extraction connector and for enabling fresh air to flow in through the fresh air inlet.

* * * * *